United States Patent Office 2,779,703
Patented Jan. 29, 1957

2,779,703
FUNGICIDAL MERCURY TERTIARY BUTYL MERCAPTIDE COMPOSITIONS AND METHOD OF APPLYING THE SAME

Willie W. Crouch and Lyle D. Goodhue, Bartlesville, Okla., assignors to Phillips Petroleum Company, a corporation of Delaware No Drawing. Application June 19, 1950,
Serial No. 169,066

3 Claims. (Cl. 167—22)

This invention relates to fungicides. In one aspect this invention relates to the preparation and use of novel fungicidal compositions of matter.

The prevention of fungus growth as well as the killing of fungi has long presented a real problem. A great many fungicidal compositions or compounds are now known. However, there is a great need for additional compounds which exhibit certain characteristics and activity desired for such compositions and this invention supplies such additional compounds, as proven in a large number of different tests.

It has now been discovered that alkyl sulfides of metals of group 2B of the periodic table are preeminently effective as fungicides. These compounds can be represented by the formula $$(RS)_xM$$

wherein M is the selected metal, R is a straight chain or branched chain group containing not more than twelve carbon atoms, $x$ is equal to 1 when the metal is monovalent and 2 when the metal is divalent and when $x$ is equal to 2 the R's can be different.

These compounds are effective against the fungi causing peach brown rot, apple bitter rot, as well as other fungi found on trees, grain, flowers, and other plants. They are particularly valuable as disinfectants for seeds such as rice, barley, peas and others. They may also be used in greenhouses to prevent "damping off" or rotting of various plants above the surface of the ground. They may be used to treat seed potatoes for the prevention of "scab" and may be used to treat gladiola bulbs for the prevention of rust. Another application of these compounds is for the impregnation of shoes, tents, textiles, leather items, etc., for the prevention of various mold formations thereon.

The compounds of this invention may be applied for their intended purpose by any suitable method. However, since these compounds are substantially insoluble in water and sparingly soluble in other suitable solvents, we prefer to apply them to trees and plants as aqueous dispersions by spraying. When used as seed disinfectants they may be mixed with talc and sprinkled on or shaken with the seed. We have found that suitable dispersions may be prepared by dissolving the compounds in a dispersing agent such as hot sorbitan monolaurate polyethylene oxide and subsequently diluting the solution so formed with water. Another method of forming emulsions for use in the present invention comprises grinding the compound into intimate admixture with a non-ionic dispersing agent, e. g. tertiary-octylphenyl polyethyl ether alcohol (Triton X–100), followed by the addition of said mixture to a suitable amount of water.

The compounds of the present invention are fungicidal in extremely low concentrations, and provide a complete kill on many fungi in concentrations as low as one part per million. A fungicide is considered good of it kills fungus spores at 10 parts per million. The fungicides of this invention, as employed, are effective in concentrations of 0.1 part per million to 10,000 parts per million, although higher concentrations may be employed if desired. Obviously, the invention is concerned with the discovery of the usefulness of the compounds of this invention and to the extent that these compounds are present a degree of effectivity will be exhibited. Thus, the range given is a range which is preferred because values within this range have been found to yield highly desirable results. It is usually desirable to apply fungicides in concentrations expressed as pounds of fungicide per 100 gallons of water. For most practical purposes, one pound of fungicide per 100 gallons of water (0.125 weight percent) will be found effective. The solutions or emulsions are applied to fruit trees, rose bushes and other plants in an amount sufficient to wet the plant with a minimum amount running from the leaves.

An advantage of the fungicidal compounds of the present invention wherein the R groups contain 4 or more carbon atoms is that they are substantially non-phytotoxic in the low concentrations employed for fungus control and show little or no phytotoxicity in concentrations far above those required to kill fungi.

Compounds of the present invention wherein the R groups contain less than 4 carbon atoms display phytotoxic effects. However, this does not preclude their utility as fungicides on textiles, leather and other articles where phytotoxicity is of no consideration.

The compounds of the present invention may be obtained from any suitable source. One method for their production comprises reacting mercaptans with solutions of metal salts.

Seven day old cultures of *Sclerotinia fructicola* (peach brown rot), *Alternaria oleracea* (a blight) and 10 to 12 day old cultures of *Glomerella cingulata* (apple bitter rot) were used in the following examples as test organisms. These spores were obtained under controlled conditions.

Spores to be used in tests were transferred from cultures containing the same by adding one ml. of Czapek's solution [1] and 10 ml. of distilled water to agar slants and shaking. The resulting suspensions contained enough spores to give 10 to 20 spores per low power field (18×ocular, 16 mm. (10×) objective).

EXAMPLE I

A one-tenth percent suspension of mercury tertiary butyl mercaptide was prepared by dissolving a sample of the compound in hot sorbitan monolaurate polyethylene oxide and subsequently adding the solution so formed to a calculated amount of water. One drop of a size that would spread to a diameter of about five mm. was placed on each end of a chemically clean microscope slide. The slide was allowed to dry for about twenty-four hours protected from dust.

A piece of platinum wire about three inches long was sealed to a glass rod and a loop one mm. in diameter formed on the end. The loop was used to transfer the spores to the fungicide deposit on the slide. Spores are always carefully transferred to the center of the fungicide deposit.

Slides so prepared, i. e., containing fungicide deposits with spores deposited thereon, were placed in a moisture chamber and incubated at 70±2° F. for 24 hours and examined under the low power (180×) of a microscope for germination. Duplicate runs were made in each case to check the results.

---
[1] Czapeks solution is a synthetic liquid medium composed of inorganic salts and sugar. It is used as a spore nutrient when the fungi are on the slides. The medium may be solidified by the addition of agar. The formula is as follows:

| | Grams |
|---|---|
| Magnesium sulfate | 0.50 |
| Dipotassium acid phosphate | 1.00 |
| Potassium chloride | 0.50 |
| Sodium nitrate | 2.00 |
| Ferrous sulfate | 0.01 |
| Cane sugar | 30.00 |

Distilled water to make 1000 cc.

After examining the slides under the microscope, if no germination had taken place, about 10 spores were transferred to an agar slant on a piece of agar about the size of a match head where the fungicide removed with them could diffuse away. When the chemical concentration of the fungicide diminishes enough, the spores have the necessary nutrients to germinate if they have not been killed already.

An aqueous suspension of mercury tertiary butyl mercaptide in a concentration of 0.1 percent prevented the growth of *Sclerotinia fructicola*, *Glomerella cingulata* and *Alternaria oleracea*.

EXAMPE II

Slides were prepared by the procedure outlined above using an aqueous suspension of mercury tertiary butyl mercaptide in a concentration of one part per million. A complete kill was effected on *Glomerella cingulata* at this concentration. ED 50[2] of this compound against *Sclerotinia fructicola* was 2.1 p. p. m.

EXAMPE III

Slides were prepared by the procedure of Example I using an aqueous dispersion of cadmium tertiary butyl mercaptide in a concentration of 0.1 percent. A complete kill was effected on *Glomerella cingulata* and *Alternaria oleracea* at this concentration. The ED 50 of this compound against *Glomerella cingulata* was 2.1 parts per million and against *Sclerotinia fructicola* was 5.2 parts per million.

EXAMPLE IV

Slides were prepared by the procedure of Example I using an aqueous dispersion of zinc tertiary butyl mercaptide in a concentration of 0.1 percent. A complete kill was effected on *Sclerotinia fructicola* and *Alternaria oleracea* at this concentration.

EXAMPLE V

A pea germination test (McCallan, S. A. E., "Evaluation of Chemicals as Seed Protectants by Greenhouse Tests with Peas and Other Seeds," contributed by Bryce Thompson Institute, 15, 91–117 (1948) was conducted using mercury tert-butyl mercaptide applied as a 5% dust using talc as the carrier. The table records the results which show that the treated seeds in infected soil emerged one hundred percent. Also, to be noted, therefore, is that the dust was not toxic to the seeds.

Table A

RESULTS OF PEA GERMINATION TESTS

|  | Dosage[2] | Percentage Emergence | |
|---|---|---|---|
|  |  | Infected Soil | Sterile Soil |
| Mercury tert-butyl mercaptide[1] | Percent 0.5 | 100 | [3] 90 |
| Untreated | 0 | [4] 10 | 100 |

[1] This was applied as a 5% dust using talc as the carrier.
[2] Based on weight of seed.
[3] The percentage germination is seldom 100 percent so 90 percent or above is considered perfect emergence.
[4] Emerged but died after very little growth.

EXAMPLE VI

An infected barley test (Skaptason, J. B., U. S. Patent 2,432,255) was conducted as follows: A nine cm. filter paper was placed in each of three ten cm. Petri dishes. To each of these papers a small mount of a 0.1 percent solution of mercury tert-butyl mercaptide in benzene was added which gave 10, 1 and 0.1 mg. of the solute respectively on each filter paper. The solvent was then allowed to evaporate completely so that it did not enter into the results. Then 6 ml. of a nutrient composed of Czapek's solution with 2% glucose is added and ten grams of barley infected with *Helminthosporum sativuum* were placed on each of the treated papers and stored at 70° F. to incubate. Two checks with no chemical on the paper were run concomitantly. Observations were made after 3 and 6 days. Results of this test are recorded below:

Table B

| Name | Amount mg. | Infection, Percent | |
|---|---|---|---|
|  |  | On Seeds | On Paper Around Seeds |
| Mercury tert-butyl mercaptide | 10 | 0 | 0 |
|  | 1 | 0 | 0 |
|  | 0.1 | 10 | 0 |
| Check | 0 | 90 | 60 |
| Check | 0 | 80 | 60 |

The results show that mercury tert-butyl mercaptide is an excellent fungicide as evidenced by infection control on the seeds as well as on the paper.

EXAMPLE VII

Mercury tert-butyl mercaptide in varying amounts was deposited on strong filter paper and the effect of washing, sunlight, wind and sunlight, dry storage, wet storage, etc. was determined. Some commercially available fungicides were subjected to the same treatments for comparisons.

(1) *Effect of washing.*—Filter papers were treated with the compounds and soaked for 24 hours in one liter of tap water. They were removed and put in clean Petri dishes, nutrient and barley added, and incubated for six days. The results are shown in Table C.

Table C

RESULTS OF WASHING TESTS

| Name | Amount mg. | Infection, Percent | |
|---|---|---|---|
|  |  | On Seeds | On Paper Around Seeds |
| Mercury tert-butyl mercaptide | 10 | 10 | 0 |
|  | 1 | 30 | 0 |
| Check #1 | 0 | 90 | 30 |
| Check #2 | 0 | 100 | 60 |

(2) *Effect of sunlight.*—Filter papers were treated with mercury tert-butyl mercaptide and exposed outdoors for one week in glass Petri dishes with the cover on.

Table D

EFFECT OF EXPOSURE TO SUNLIGHT FOR 7 DAYS

| | Percent Infected | | | |
|---|---|---|---|---|
|  | 10 Mg. | | 1 Mg. | |
|  | Seeds, percent | Paper, percent | Seeds, percent | Paper, percent |
| Mercury tert-butyl mercaptide | 0 | 0 | 100 | 70 |

(3) *Effect of wind and sunlight.*—For the control of fungus diseases on plants the fungicide should resist weathering for a period long enough to kill nearly all the spores present. To simulate conditions in a tree,

---

[2] ED 50 is an abbreviation for the term 50 percent effective dose (the amount of chemical needed to inhibit the germination and growth of 50 percent of the fungus spores). Comparison of the inverse ratios of the ED 50's of various compounds provides a means for determining their relative toxicities. The ED 50 of a fungicide is determined by employing varying dosages that inhibit between 5 and 95 percent of the fungus germination and growth. These values are plotted on log-probability (probits) paper where the points usually fall near a straight line. The ED 50 is then determined from the line or curve as the dosage in parts per million necessary to inhibit the germination and growth of 50 percent of the fungus spores.

treated filter papers were exposed on the roof of a building. They were suspended with pincer-type clothespins attached to a wire. No rain fell during the exposure recorded. Various exposure periods from one hour to seven days were used. Papers treated with 10 and 1 mg. were used. The results are shown in Table E.

Table E

THE EFFECT OF WIND AND SUNLIGHT FOR VARIOUS PERIODS

| | Doses, Mg. | Percentage Infection of Barley Incubated on Exposed Papers | | | | | | | |
|---|---|---|---|---|---|---|---|---|---|
| | | 1 Hour | | 24 Hours | | 3 Days | | 7 Days | |
| | | Seed, percent | Paper, percent | Seed, percent | Paper, percent | Seed, percent | Paper, percent | Seed, percent | Paper, percent |
| Mercury tert-butyl mercaptide | 10 | 0 | 0 | 0 | 0 | 0 | 0 | 100 | 40 |
| | 1 | 30 | 10 | 0 | 0 | 0 | 0 | 90 | (¹) |

¹ Fungus scattered over the paper.

(4) *Effect of wet and dry storage.*—Short period tests were made by storing in a dark place dry, treated filter papers in open Petri dishes and wet, treated papers in closed Petri dishes. After one week the papers were moistened with nutrient solution and infected barley was incubated on them in the usual manner.

Table F contains the results of the tests.

Table F

EFFECT OF WET AND DRY STORAGE IN THE DARK FOR ONE WEEK

| | Percentage Infection of Barley Incubated on Stored Papers | | | |
|---|---|---|---|---|
| | 10 Mg. | | 1 Mg. | |
| | Seed | Paper | Seed | Paper |
| *Wet* | | | | |
| Mercury tert-butyl mercaptide | 0 | 0 | 0 | 0 |
| *Dry* | | | | |
| Mercury tert-butyl mercaptide | 0 | 0 | 40 | 0 |

(5) *Bulk storage over extended periods.*—The compounds of this invention have been found to retain their fungicidal activity through extended storage periods. For example, one sample of mercury tert-butyl mercaptide was effective after having been stored in a brown bottle for more than two years.

EXAMPLE VIII

An infected barley test was conducted according to the method of Example VI wherein mercury methyl mercaptide, mercury ethyl mercaptide and mercury isopropyl mercaptide were employed in varying concentrations to inhibit the growth of *Helminthosporum sativuum*. Results are recorded in the table below:

| Compound | Amount, Mg. | Percentage Infection After X days | | | |
|---|---|---|---|---|---|
| | | 3 days | | 6 days | |
| | | On seed | On paper around seed | On seed | On paper around seed |
| Mercury isopropyl mercaptide | 10 | 0 | 0 | 0 | 0 |
| Do | 1 | 0 | 0 | 0 | 0 |
| Do | 0.1 | 0 | 0 | 0 | 0 |
| Mercury ethyl mercaptide | 10 | 0 | 0 | 0 | 0 |
| Do | 1 | 0 | 0 | 0 | 0 |
| Do | 0.1 | 0 | 0 | 0 | 0 |
| Mercury methyl mercaptide | 10 | 0 | 0 | 0 | 0 |
| Do | 1 | 0 | 0 | 50 | 20 |
| Do | 0.1 | 0 | 0 | 50 | 30 |

Results of the foregoing tests indicate that the lower molecular weight compounds of the present invention are effective fungicides.

EXAMPLE IX

A seed protection test was run wherein barley seeds infested with *Helminthosporum sativuum* were treated with mercury tertiary-butyl mercaptide deposited on talc. The following mixture was tumbled in a small glass container to coat the seeds.

5 weight percent mercury tert-butyl mercaptide deposited on talc from benzene solution _____ mg__ 40
Triton X-166 (alkylated aryl polyether alcohol) wetting agent _____ mg__ 10
Barley seed infected with *Helminthosporum sativuum* _____ grams__ 10

A nine centimeter filter paper was placed in a ten centimeter Petri dish and 5 cc. of aqueous nutrient solution³ added. Ten treated barley seeds were then placed on the filter and stored at 70±2° F. to germinate. Readings were made after 3 and 6 day intervals. Untreated checks, i. e. untreated, infected seeds, were run concomitantly.

At a concentration of .02 weight percent of the seeds, mercury tertiary-butyl mercaptide completely prevented the growth of *Helminthosporum sativuum* and all other mold and allowed the seeds to sprout and grow normally.

In the untreated checks the fungus grew profusely on both the seeds and paper and prevented normal sprouting of the barley seeds. Roots and stems on about 50 percent of the seeds were consumed by the fungus.

Since commercial practice entails the use of two ounces of fungicide per bushel of seed, the results of the foregoing test demonstrate the high fungicidal activity of the compound tested wherein approximately 0.2 ounce per bushel provided substantially complete protection.

Although there are numerous uses for fungicides other than for the control of plant diseases, the usefulness is greatly extended if the chemical is low in phytotoxicity. Mercury tert-butyl mercaptide appears to have little or no effect on plants as tested under laboratory conditions.

*Toxicity to young bean plants.*—During the screening tests for herbicidal action mercury tert-butyl mercaptide was mixed with lanolin and applied to a leaf, a stem, and a petiole. These tests were made 3 times. One test out of the three showed a slight injury to a leaf. No damage occurred on the stem or petiole.

*Toxicity to sprouting seeds.*—*Rice.*—As much as 100 mg. of mercury tert-butyl mercaptide on a filter paper allowed rice to grow to some extent. Smaller amounts, 20 mg. or less had no effect on the sprouting and growth. 100 mg. is 1000 times the amount required for seed disinfection.

*Radish.*—At 10 mg. on a filter paper radishes sprouted and grew normally.

*Barley.*—At 100 mg. on a filter paper barley sprouted and grew normally. As expected, with 20 mg. on a filter paper no reduction in growth could be detected.

³ The nutrient solution comprised Czapeck's solution containing 2 percent added glucose.

Also barley coated with a dust containing five percent of the mercaptide grew normally.

*Peas.*—As previously stated under the pea germination test, peas coated with a five percent dust of the compound were not affected.

Seeds stored for three months with 0.5 weight percent of mercury tert-butyl mercaptide are not affected and germinate as well as seeds treated on the same day of planting. Germination is very poor on untreated seeds because the fungus attacks the sprouts.

Typical compounds applicable to the present invention include mercury methyl mercaptide, cadmium ethyl mercaptide, mercury octyl mercaptide, cadmium tert-octyl mercaptide, mercury tert-dodecyl mercaptide and the like.

In some instances it may be found that the compounds of the present invention display toxic effects to men and animals. Therefore caution should be exercised in their use.

EXAMPLE X

Rice known to be infected with several kinds of mold including some from the genus Aspergillus and others from the genus Penicillium was used to test the fungicidal properties of mercury-tertiary-butyl mercaptide. Ten grams of the mercaptide was applied in benzene solution to a 9 cm. filter paper. The paper was then dried and placed in a 10 cm. Petri dish. Ten grains of the infected rice were placed on the paper. Another ten grains were placed on a paper treated in a similar manner except that no mercury-tertiary-butyl mercaptide was used to serve as a check. Six milliliters of water was added to each dish and the samples were incubated at 70° F. for six days. At the end of the test period no mold was observed on the treated sample while several kinds, including those mentioned above were growing profusely on the untreated sample.

EXAMPLE XI

The test of Example X was repeated using cadmium-tertiary-butyl mercaptide. All mold growth was prevented on the treated sample.

EXAMPLE XII

Samples of leather about 2" x 4" in size are drummed for three hours in 20 times their weight of distilled water to remove any readily soluble preservatives. The washed leather is then inoculated by swabbing with a mold spore suspension. These inoculated samples are incubated in a moist atmosphere (85–90% relative humidity) for a period of 30 days. Observations during this period show a profuse growth of molds, including such organisms as *Chaetomium globosum* and Meterrhizum species. Parallel runs in which the leather is treated with a benzene solution of mercury-tertiary-butyl mercaptide, the benzene evaporated, the leather moistened with water and inoculated in the same manner show no detectable mold growth when incubated for the same length of time under identical conditions.

Reasonable variation and modification are possible within the scope of the foregoing disclosure and the appended claims to the invention the essence of which is that alkyl sulfides of a metal selected from the above stated group of the periodic table have been found to be preeminently effective as fungicides, by mere application of them to the situs of fungi growth. "Fungi situs" herein and in the claims means a place where fungi have grown or may grow.

We claim:

1. A method for preventing the growth of fungi on plants which comprises applying to the plant mercury tertiary butyl mercaptide in a concentration of 0.1 to 10,000 parts per million in a fungicidal adjuvant as a carrier therefor.

2. A fungicidal composition which is substantially non-toxic to the fungi situs comprising from 0.1 to 10,000 parts per million of mercury tertiary butyl mercaptide dispersed in a fluid fungicidal adjuvant as a carrier therefor.

3. A method for preventing the growth of fungi which comprises applying to the fungi situs mercury tertiary butyl mercaptide in a concentration of 0.1 to 10,000 parts per million in a fungicidal adjuvant as a carrier therefor, said mercaptide being substantially non-toxic to the fungi situs.

References Cited in the file of this patent

UNITED STATES PATENTS

| | | |
|---|---|---|
| 2,434,291 | Smith | Jan. 13, 1948 |
| 2,471,621 | Hartmann et al. | May 31, 1949 |
| 2,533,744 | Skinner et al. | Dec. 12, 1950 |